(12) United States Patent
Watts et al.

(10) Patent No.: US 10,621,462 B2
(45) Date of Patent: *Apr. 14, 2020

(54) DENSITY SAMPLING MAP DATA

(71) Applicant: Apple Inc., Cupertino, CA (US)

(72) Inventors: Michael Marcel William Watts, San Francisco, CA (US); Erez Cohen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/110,627

(22) Filed: Aug. 23, 2018

(65) Prior Publication Data

US 2018/0365513 A1    Dec. 20, 2018

Related U.S. Application Data

(63) Continuation of application No. 14/480,451, filed on Sep. 8, 2014, now Pat. No. 10,074,027.

(51) Int. Cl.
  *G01C 21/36* (2006.01)
  *G06F 16/29* (2019.01)
  *G06K 9/46* (2006.01)

(52) U.S. Cl.
  CPC .......... *G06K 9/46* (2013.01); *G01C 21/3679* (2013.01); *G06F 16/29* (2019.01)

(58) Field of Classification Search
  CPC ........... G01C 21/3679; G01C 21/3682; G01C 21/3685; G01C 21/3673; G09B 29/006; G09B 29/007; G06F 16/29; G06K 9/46

USPC .................................................. 382/113, 305
  See application file for complete search history.

(56) References Cited

U.S. PATENT DOCUMENTS

| | | | |
|---|---|---|---|
| 6,405,129 B1 | 6/2002 | Yokota | |
| 6,542,814 B2 | 4/2003 | Polidi et al. | |
| 8,830,271 B1 | 9/2014 | Jordan et al. | |
| 9,149,716 B2 | 10/2015 | Tanzawa et al. | |
| 2006/0123014 A1 | 6/2006 | Ng | |
| 2006/0287919 A1 | 12/2006 | Rubens et al. | |
| 2008/0270468 A1 | 10/2008 | Mao et al. | |
| 2010/0191797 A1* | 7/2010 | Seefeld | G06F 16/9537 709/203 |
| 2012/0001938 A1 | 1/2012 | Sandberg | |
| 2012/0197524 A1 | 8/2012 | Beyeler et al. | |
| 2014/0074395 A1* | 3/2014 | Brown | G01C 21/3682 701/424 |
| 2015/0339320 A1* | 11/2015 | Herron | G06F 16/904 707/722 |

OTHER PUBLICATIONS

Pandey et al., "Shuffling a Stacked Deck: The Case for Partially Randomized Ranking of Search Engine Results", Proceedings of the 31st VLDB Conference, Trondheim, Norway, 2005, 12 pages.

(Continued)

*Primary Examiner* — Geoffrey E Summers
(74) *Attorney, Agent, or Firm* — Invoke

(57) ABSTRACT

Sampling data is disclosed. A region of a map to be rendered is determined. It is determined that a first subregion is included in the region. Data points associated with subregions in a neighborhood of the first subregion are analyzed to determine a regional density of points. Data points associated with the first subregion are sampled based on the regional density of points.

24 Claims, 5 Drawing Sheets

(56) References Cited

OTHER PUBLICATIONS

Mennis, Jeremy, and Torrin Hultgren. "Intelligent dasymetric mapping and its application to areal interpolation." Cartography and Geographic Information Science 33.3 (2006): 179-194.
Feres Renato, "A few useful MATLAB functions", Math 350 Fall, 2012, 6 pages.
"Density Calculations" Quantitative Decisions, May 28, 2013, Web Accessed Dec. 13, 2017.

\* cited by examiner

DENSITY SAMPLING MAP DATA

INCORPORATION BY REFERENCE; DISCLAIMER

The following application is hereby incorporated by reference: application Ser. No. 14/480,451 filed on Sep. 8, 2014; The Applicant hereby rescinds any disclaimer of claim scope in the parent application or the prosecution history thereof and advises the USPTO that the claims in this application may be broader than any claim in the parent application.

BACKGROUND OF THE INVENTION

When mapping or performing geospatial analysis of a geographic dataset such as a set of points of interest on a map, the dataset may be too large to efficiently render on a map. For example, when a large number of data points are to be plotted, the visual representations of the data points may end up crowding map regions to obscure visual trends of the data points. In order to visualize trends of the dataset, it may be desirable to select a subset of representational data points to display rather than displaying the entire dataset. Additionally, it may be computationally expensive to display a large amount of data especially in a vector format, and a reduction in the number of data points to render may result in performance improvements. Therefore there exists a need for an efficient and effective way to sample a geographic dataset.

BRIEF DESCRIPTION OF THE DRAWINGS

Various embodiments of the invention are disclosed in the following detailed description and the accompanying drawings.

DETAILED DESCRIPTION

Figure 1:
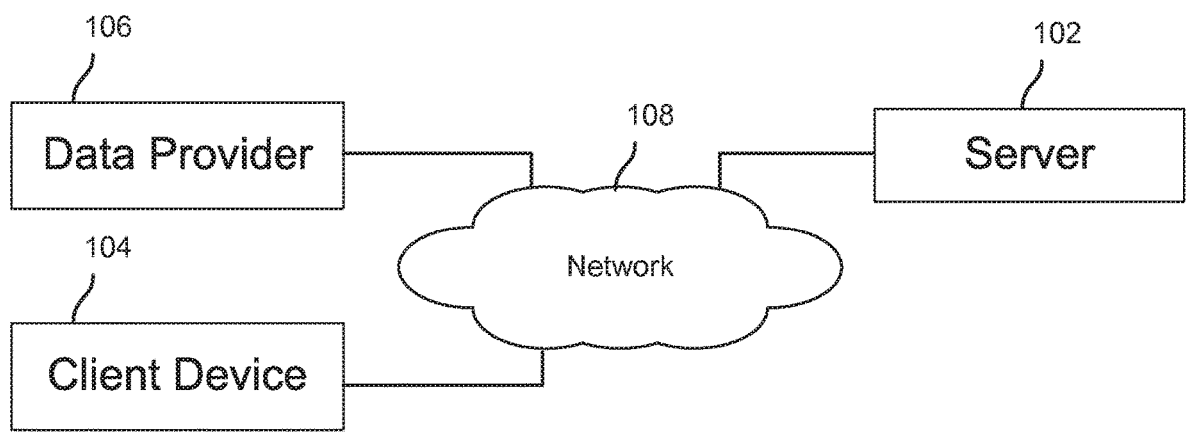
FIG. 1 is a block diagram illustrating an embodiment of an information rendering environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rendering information is disclosed. For example, location points of interest are rendered on a map. In some embodiments, a region of a map to be rendered is determined. For example, a region of a map to be displayed is determined. Data points associated with a first subregion that is included in the region is retrieved. For example, the map is divided into a plurality of subregions (e.g., non-overlapping map subregion tiles make up the map) and data points of the first subregion that are of interest (e.g., data points located in the first subregion that match a desired type of data to be rendered) are retrieved. Data points associated with subregions in the neighborhood of the first subregion are retrieved to determine a regional density of points for the first subregion. For example, data points of interest that are located in one or more subregions adjacent to the first subregion are retrieved and the regional density of points is determined by multiplying a desired reference density by a total area of the subregions in the neighborhood of the first subregion and dividing by the total number of data points in those subregions. The data points associated with the first subregion are sampled based on the determined regional density of points. For example, a subset of data points to be rendered from the data points associated with the first subregion is selected and the number of data points that are selected is based on the determined regional density of points.

FIG. 1 is a block diagram illustrating an embodiment of an information rendering environment. Server 102 is connected to client device 104 and data provider 106 via network 108. In some embodiments, data provider 106 provides data to be processed and served by server 102. For example, data provider 106 provides a dataset of data points (e.g., each data point is associated with a geographical location) and server 102 processes the provided dataset to enable one or more users to analyze, sort, search, obtain, render, and/or visualize the dataset. Processing the dataset may include sorting data points of the dataset into groups corresponding to map subregions where each group of points belongs for efficient processing and data retrieval. Server 102 may store the processed provided data in a storage such as a local and/or network storage. Client device 104 may request to server 102 data associated with the data provided by data provider 106 to server 102. For example, a user of client device 104 indicates that the user desires to view/render data points that meet specified search constraints (e.g., data points responsive to search query, data filters, etc.) on a selected map region, and the data, points to be rendered are requested from server 102. When server 102 receives the request for the data points, server 102 may sample matching data points to provide a subset of the data points in a map region of interest that match the request. The subset of the data points may be selected using a regional density of points (e.g., sampling rate) determined for a particular subregion. In some embodiments, the provided data points by server 102 are cached by client device 104 and client device 104 renders the provided data points on a displayed map. In the event a user of client device 104 modifies the request for the desired data points (e.g., changes a data filter), client device 104 determines whether the cached data points are sufficient to render the result of request and requests new data points if the cached data points are not sufficient.

Examples of client device 104 and data provider 106 include a server, a personal computer, a desktop computer, an electronic reader, a laptop computer, a smartphone, a tablet computer, a mobile device, a wearable device, a wearable computer, and any other computer or electronic device. Examples of server 102 include any computer or a group of computers configured to provide data. Examples of network 108 include one or more of the following: a direct or indirect physical communication connection, mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. Other communication paths may exist and the example of FIG. 1 has been simplified to illustrate the example clearly. Although single instances of components have been shown to simplify the diagram, additional instances of any of the components shown in FIG. 1 may exist. Components not shown in FIG. 1 may also exist to perform and provide functions and services described in this document.

Figure 2:
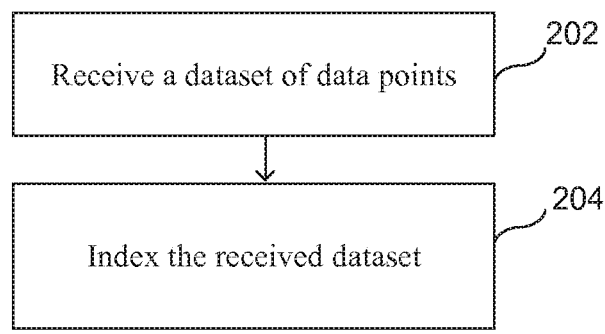
FIG. 2 is a flowchart illustrating an embodiment of a process for indexing data.

FIG. 2 is a flowchart illustrating an embodiment of a process for indexing data. The process of FIG. 2 may be implemented on server 102 of FIG. 1.

At 202, a dataset of data points is received. In some embodiments, the dataset includes data points that a data provider such as data provider 106 of FIG. 1 desires to enable rendering on a map. For example, the data provider provides data points and each data point is associated with one or more attributes/fields and a geographical location identifier (e.g., latitude and longitude location coordinate, axis coordinate, etc.). By plotting the geographical location coordinates of the data points of interest, a graphical pattern of the data points of interest may be determined. In one example, the dataset includes data points of crime incidents with attributes/fields such as time of the incident, type of incident, description of the incident, and indication of resolution of the incident as well as a location coordinate of where the incident occurred. By plotting crime incidents that are indicated as of interest by a user (e.g., crime incidents of a specific type that occurred at specified time window, etc.), a geographical pattern of the crime incidents of interest may be determined. In some embodiments, examples of the dataset include database records, a table, a list, a chart, a spreadsheet, and any other data grouping. In some embodiments, the dataset is specific to a user account and only authorized users associated with the user account are able to access the dataset. The dataset may be provided periodically and/or dynamically. For example, the dataset is updated periodically and/or provided when new data or changed data is detected.

At 204, the received dataset is indexed. In some embodiments, indexing the received dataset includes analyzing, sorting, preprocessing, structuring and/or sorting the dataset to enable portions of the dataset to be retrieved/rendered efficiently. In some embodiments, indexing the received dataset includes sorting data points/records of the dataset according to a geographical location of the data points/records. For example, a map is divided into subregions (e.g., rectangular area map tiles) and data points/records that belong to the same subregion (e.g., geographical location coordinate of the data point belongs in the subregion) are grouped together. In some embodiments, the map for each zoom level is divided into different subregions and a data record/point is sorted into a different corresponding grouping for each different zoom level. These grouping of data records may be saved and associated together in one or more data structures.

In some embodiments, indexing the dataset includes assigning a random number (e.g., a random number between and including zero and one) to each data point/record of the dataset as the sampling identifier of the data point/record. This random number may be utilized to efficiently and predictably sample the dataset. For example, in order to identify a random yet predictable ten percent of data points of the dataset, data points with sampling identifiers that are within a certain ten percent of the range of random numbers are identified. In some embodiments, the random sampling identifier is utilized in organizing the dataset in an ordered data structure (e.g., data points belonging to a particular subregion are stored in the same data structure). For example, the sampling identifier is utilized to store data points/records of the dataset in an ordered tree data structure (e.g., trie). By storing the data points/records of the dataset using their associated random numbers in a data structure ordered using the random numbers, range queries of the random numbers may be efficiently performed to obtain data records with associated random numbers in a desired range, in some embodiments, the dataset is stored in one or more ordered data structures organized using the associated subregion and associated sampling identifier of each data point/record of the dataset. For example, a separate data structure and/or separate data structure section exists for each different subregion (e.g., subregion of each map zoom level) and data points/records that belong to a specific subregion are stored in the corresponding data structure or data structure section in an order determined by the associated sampling identifier of each data record. In some embodiments, indexing the dataset includes precomputing the number of data points/records that belong to each subregion. For example, for a particular subregion, the total number of data points of the dataset that belong to the subregion and match constraints of various popular search queries is predetermined.

Figure 3:
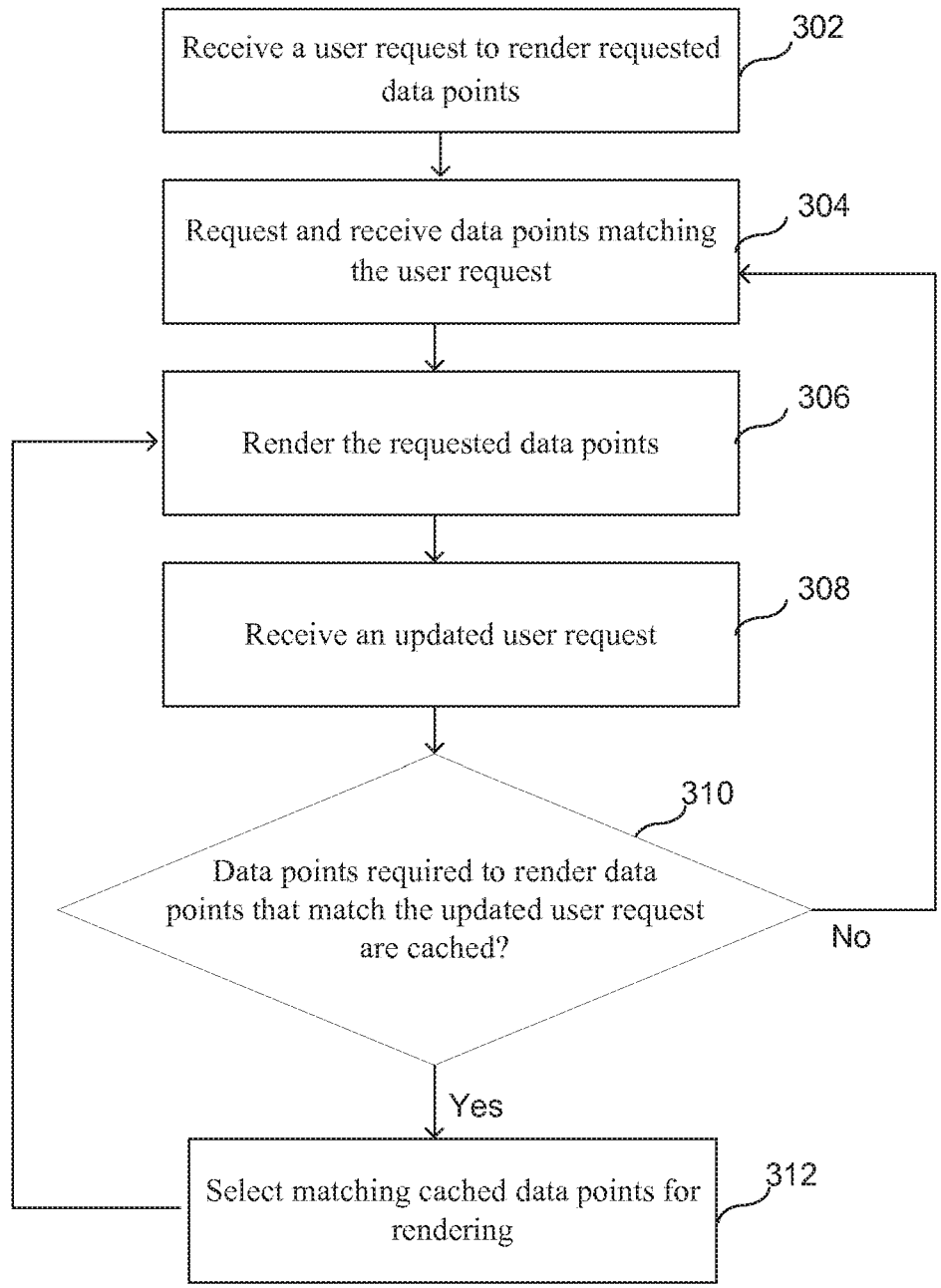
FIG. 3 is a flowchart illustrating an embodiment of a process for rendering requested data records.

FIG. 3 is a flowchart illustrating an embodiment of a process for rendering requested data records. The process of FIG. 3 may be implemented on client device 104 of FIG. 1.

At 302, a user request to render requested data points is received. The request may include an indication of a desired map region to be rendered, a map zoom level, and one or more constraints that identify desired data points to be rendered over the desired region. For example, a user specifies a search query and/or one or more data filters/data selections (e.g., check boxes, range sliders, drop down boxes, etc.) that data points must satisfy to be rendered along with a specification of a map region where the matching data points are to be rendered. In some embodiments, the specification of a map region is based on a map region navigated by a user. For example, an indication of a map region and configuration (e.g., zoom level, map detail layers, etc.) selected on a client device for display is provided.

At 304, data points matching the user request are requested and received. For example, at least a portion of the user request of 302 is provided to a server (e.g., server 102 of FIG. 1) and the server provides data points that match the user request. In some embodiments, the received data points are for an indicated map region to be rendered. For example, the user request identifies a map region displayed on a client device display, and data points matching the user request and within the identified map region are received. In some embodiments, in addition to the matching data points, base map data is received. For example, a base map on which data points are to be rendered is received. The map data may include vector map data, map tile(s), point of interest, map features, map layers, map images, map controls, map overlays, map labels, etc. The base map data may be cached and/or saved for subsequent use.

In some cases when rendering a high concentration of visual representations of data points matching the user request, it may be difficult to discern each individual data point from each other in the concentrated region. Additionally, rendering a large number of visual representations of the data points may obscure the geographical distribution pattern of the data points. By sampling or reducing the number of data points to render to an optimal density, an optimal number of data points matching the user request may be efficiently rendered in a manner that visually preserves the geographic distribution of the matching data points.

In some embodiments, the received data points are a subset of data points that match the user request, and the subset has been selected based at least in part on a desired density of data points. For example, for an indicated map region, the data points that match the user request are determined and sampled to identify a subset of matched data points associated with a desired density of data points. A desired density may be specified as a number of data points per unit area. In some embodiments, the received data points have been sampled by taking into consideration distribution of data points surrounding a subregion of interest. For example, when selecting the number of data points to render in a certain map subregion, the numbers of data points in neighboring map subregions that also match the request are taken into consideration.

At 306, the requested data points are rendered. In some embodiments, rendering the data points includes plotting a visual representation of each received matching data point at its corresponding geographical coordinate location on a map of an indicated map region. For example, dot markers representing the data points are plotted over a base map of an indicated map region displayed on a client device display. In some embodiments, controls to modify and/or indicate a new request for data points are provided. For example, data selection controls, filters, and query input boxes are provided as rendered user interface items.

At 308, an updated user request is received. The updated request may include an updated indication of a new desired map region to be rendered, a new map zoom level, and/or a request for new data points to be rendered. For example, a user may specify a new map region to be rendered, a new search query (e.g., description of desired location points) and/or a new configuration of one or more data filters/data selectors.

At 310, it is determined whether data points required to render data points that match the updated user request are cached. Determining whether data points that match the updated user request are cached includes determining whether the data points are cached at a client device. For example, data points received in response to one or more previous user requests are cached. In some embodiments, determining whether the updated user request matching data points are cached includes determining whether the updated user request at least includes all of search constraints of a previous user request. For example, matching data points of a previous user request have been cached/saved and if the updated user request adds an additional data point search constraint (e.g., specifies an additional constraining data filter) in addition to the constraints of a previous user request, the cached data points of the previous user request can be additionally constrained/filtered locally to identify the matching data points of the updated user request. In some embodiments, if the updated user request is a broadening new user request that requests additional data points beyond cached data points, it is determined that required data points are not cached.

In some embodiments, determining whether required data points are cached includes determining whether the cached data points matching the updated user request satisfy a desired density of data points. For example, it is determined whether enough cached data points matching the updated user request exist in one or more map subregions. If it is determined that the desired density of data points is not satisfied for one or more map subregions to be rendered, it may be determined that the required data points are not cached.

If at 310, it is determined that the required data points are cached, at 312, the matching cached data points are selected for rendering and the selected data points are provided for rendering at 306. In some embodiments, selecting the matching cached data points includes sampling the matching cached data points using a determined sampling rate. For example, a subset of the matching cached data points is selected for rendering.

If at 310, it is determined that the required data points are not cached, the process returns to 304 where data points matching the updated user request are requested and received.

Figure 4:
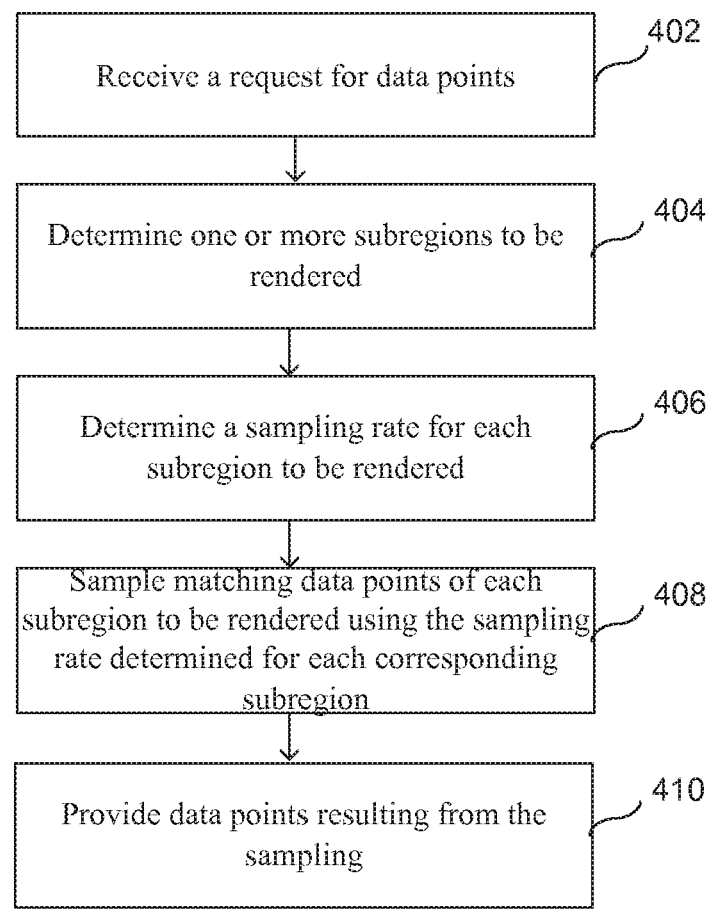
FIG. 4 is a flowchart illustrating an embodiment of a process for providing requested data points.

FIG. 4 is a flowchart illustrating an embodiment of a process for providing requested data points. The process of FIG. 4 may be implemented on server 102 of FIG. 1. In some embodiments, the process of FIG. 4 provides data points requested and received in 304 of FIG. 3.

At 402, a request for data points is received. In some embodiments, the request for data points is received from 304 of FIG. 3. The request may include an indication of a desired map/geographical region, constraints that match desired data points, a search query (e.g., description of desired location points), and/or an indication of one or more data filters/selections (e.g., check boxes, range sliders, drop down boxes, etc.) that identify matching data points to be rendered. In some embodiments, the received request includes a specification of a map region and map configuration (e.g., zoom level, map detail, etc.) based on a map region navigated by a user. For example, an indication of a map region and configuration selected on a client device display for rendering is received. In some embodiments, the request requests one or more data points received and indexed using the process of FIG. 2.

At 404, one or more subregions to be rendered are determined. In some embodiments, determining the subregions includes determining a region of a map where desired points are to be located and rendered. In some embodiments, determining the subregion includes identifying one or more predetermined subregions identified by one or more received identifiers of a map region to be rendered. For example, each zoom level of a map has been divided into predetermined subregions (e.g., rectangular tiles) and each predetermined subregion is associated with presorted data points (e.g., presorted using the process of FIG. 2), if any, that belong within the subregion. The request received in 402 may include one or more identifiers of the predetermined subregions where matching data points are to be located. In some embodiments, the one or more subregions to be rendered are associated with a map region to be displayed on a client device display. For example, determining the one or more subregions to be rendered includes determining which predetermined subregions correspond to the map region to be displayed on a client device.

At 406, a sampling rate is determined for each subregion to be rendered. In some embodiments, the sampling rate identifies a percentage of data points to be rendered. For example, the sampling rate indicates a desired portion amount of data points matching the received request that should be rendered and/or provided to be rendered. In some embodiments, determining, the sampling rate includes utilizing a desired density factor. In some embodiments, the desired density factor identifies a desired baseline number of data points to render per unit area. The desired density factor may be received at 402, preconfigured, and/or dynamically determined (e.g., dynamically determined based on type of data point to be rendered, number of data points to be rendered, other data points rendered, client device display characteristics (e.g., screen size, number of pixels), map zoom level, specified by a user, etc.). In some embodiments, determining the sampling rate for a particular subregion of interest includes determining a total number of data points that match a received request in one or more neighboring subregions that include the subregion of interest and the total area of these subregions. For example, for each subregion to be rendered, a total number of data points that match the received request in the subregion to be rendered as well as in neighboring subregions is determined.

By taking into consideration the neighboring subregions, the sampling rate may remain proportional between nearby subregions. For example, a first subregion includes a large number of matching data points while a second adjacent subregion includes a small number of matching data points. In this example, if the subregions were sampled independently without taking its neighbors into consideration, the first subregion may be sampled to only a small number of matching data points while the second subregion may be sampled to render all of its points to maintain a similar target number of data points across all the rendered subregions. However, the first and second subregions are not visually comparable because they have been inconsistently sampled. In order to maintain a comparable and proportional sampling rate across neighboring subregions, the density of points in neighboring subregions may be taken into consideration when determining a sampling rate for a subregion. The neighbor subregions utilized when determining a sampling rate for a particular subregion may extend into subregions that are not to be rendered. In some embodiments, the sampling rate is a value between zero and one, inclusive. The sampling rate may be a percentage value.

In some embodiments, determining the matching data points in a subregion includes determining which data points belonging to the subregion satisfy a received request. For example, the received request includes a specification of search query and/or other constraints and data points that match the query and/or constraints are identified as data points that match the received request.

At 408, matching data points of each subregion to be rendered are sampled using the sampling rate determined for each corresponding subregion. In some embodiments, sampling the matching data points includes selecting a subset, if applicable, of the matching data points. For example, the sampling rate identifies a desired portion amount of the data points to select. In some embodiments, the sampling rate is a numeric value between zero and one, inclusive. In some embodiments, the sampling rate is a percentage value. In some embodiments, sampling the matching data points of a subregion includes randomly selecting a number of the matching data points that corresponds to the determined sampling rate. For example, a total number of matching data points is multiplied by the determined sampling rate and the resulting number of the matching data points is randomly selected from the matching data points of the subregion.

In some embodiments, sampling the matching data points of a subregion includes predictably selecting a random subset of matching data points, if applicable, using the determined sampling rate for the subregion. For example, by predictably selecting a random subset of matching data points, the same resulting data points from sampling can be repeatedly selected for the same received request and same sampling rate of a sampling.

In some embodiments, predictably selecting a subset of matching data points includes utilizing a data structure with data point entries that are each associated with a sampling identifier (e.g., random number). For example, the data structure determined in 204 of FIG. 2 is utilized. In some embodiments, sampling matching data points of a subregion to be rendered includes selecting data points in the data point data structure of the subregion that are associated with a sampling identifier that is within a range between zero and the determined sampling rate, inclusive. For example, the sampling identifier is a predetermined random number between zero and one, inclusive, and the sampling rate is also a number that can be between zero and one, inclusive. By selecting data points associated with a sampling identifier between zero and the sampling rate, the number of data points selected as compared to the total number of data points may correspond to a portion (e.g., percentage) indicated by the sampling rate (e.g., percentage of data points with an associated predetermined random sampling identifier within range of the sampling rate is statistically similar to the sampling rate). In some embodiments, sampling matching data points of a subregion to be rendered includes selecting data points in the data point data structure of the subregion that both match a received request (e.g., match a selection criteria/query) and are associated with a sampling identifier that is within a range identified by the determined sampling rate for the subregion.

In some embodiments, determining whether a sampling identifier is within a certain range includes performing a range query on using an ordered data structure that includes entries of data points associated with sampling identifiers. For example, a range query is performed using a trie data structure.

At 410, the data points resulting from the sampling are provided. For example, the data points resulting from the sampling selection in 408 are provided for rendering. In some embodiments, the selected data points are provided to be received in 304 of FIG. 3.

Figure 5:
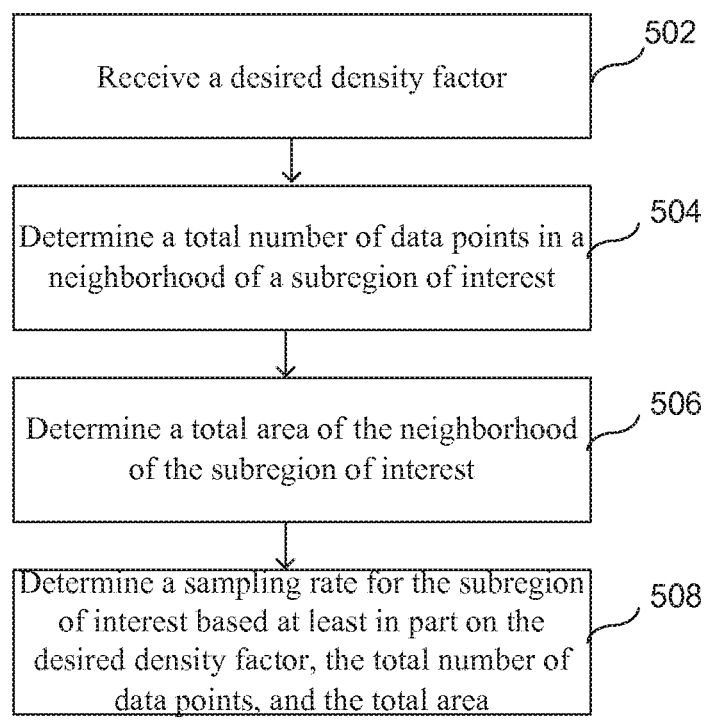
FIG. 5 is a flowchart illustrating an embodiment of a process for determining a sampling rate.

FIG. 5 is a flowchart illustrating an embodiment of a process for determining a sampling rate. The process of FIG. 5 may be implemented on server 102 of FIG. 1. In some embodiments, the process of FIG. 5 is included in 406 of FIG. 4. In some embodiments, the process of FIG. 5 is utilized to determine a sampling rate for each subregion to be rendered.

At 502, a desired density factor is received. In some embodiments, desired density factor is received in 402 of FIG. 4. In some embodiments, the desired density factor identifies a desired baseline number of data points to render per unit area. The desired density factor may be preconfigured and/or dynamically determined (e.g., dynamically determined based on type of data point to be rendered, number of data points to be rendered, other data points rendered, client device display characteristics, map zoom level, specified by a user, etc.).

At 504, a total number of data points in a neighborhood of a subregion of interest is determined. In some embodiments, determining the total number of data points includes determining the neighborhood of the subregion of interest. In one example, the neighborhood includes all adjacent subregions of the subregion of interest and the subregion of interest. In another example, the neighborhood includes all subregions within two (or another number in various embodiments) subregions away from the subregion of interest. In another example, the neighborhood includes all subregions within a predetermined distance or a dynamically determined distance away from the center of the subregion of interest. In another example, the neighborhood includes all subregions of a map. In various embodiments, the subregions included in a neighborhood of the subregion of interest may be preconfigured, indicated by a received identifier, and/or dynamically determined (e.g., dynamically determined based on map type, map region, type of data points to be provided, received request, client device type, network connection speed, network connection bandwidth, etc.).

In some embodiments, determining the total number of points includes summing the total number of data points that match a received request (e.g., matching a search query, data filters, constraints, etc.) in the subregions included in the neighborhood of the subregion of interest. The number of data points that match a received request in each subregion included in the neighborhood of the subregion of interest may be saved/cached for use in determining another sampling rate. In some embodiments, the number of matching data points in each subregion of the neighborhood is weighted when determining the total number of data points. For example, data points belonging to a subregion closer to the subregion of interest are weighed greater than data points belonging to a subregion further away from the subregion of interest. This may allow data points closer to the subregion of interest to have a larger influence than data points further away.

At 506, the total area of the neighborhood of the subregion of interest is determined. For example, the total area of all the subregions included in the neighborhood determined in 504 is determined. In some embodiments, determining the total area includes determining the number of subregions included in the neighborhood. For example, if all subregions are equal in size, the number of subregions may be multiplied by the subregion area to determine the total area. In some embodiments, the determined area of each subregion in the neighborhood of the subregion of interest is saved/cached for use in determination of another sampling rate. In some embodiments, the area of each subregion in the neighborhood is weighted when determining the total area. For example, area belonging to a subregion closer to the subregion of interest is weighed greater than a subregion further away from the subregion of interest. This may allow subregions closer to the subregion of interest to have a larger influence than subregions further away. The area weight of each subregion may be the same or different than the count weight utilized in 504.

At 508, a sampling rate for the subregion of interest is determined based at least in part on the desired density factor, the total number of data points, and the total area. For example, the desired density factor is multiplied by the weighted total area of the neighborhood and divided by the weighted total number of data points of the neighborhood to determine the resulting sampling rate. In the event the resulting value is greater than one, the sampling rate may be set as one. In some embodiments, the sampling rate, r, is determined using the following calculation.

$$r = \min\left(d * \frac{\sum_{n \in N} w_n * a_n}{\sum_{n \in N} w_n * c_n}, 1\right)$$

In the above equation, $d$ is the desired density factor (e.g., the desired number of points in a region of unit area), N is the neighborhoods of the subregion of interest, including subregion of interest itself, n is the subregion within the neighborhood, $w_n$ is the weight for subregion n, $c_n$ is the number of matched data points within n, and $a_n$ is the area of n. The min function ensures r has a maximum value of 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A non-transitory machine-readable medium storing a program for sampling data points in a map region, the program executable by at least one processor of a first device, the program comprising sets of instructions for:
   receiving a first request for data points from a second device, wherein the first request includes a desired density of data points;
   identifying a first plurality of data points associated with a first region of a map to be rendered based on the first request;
   identifying a second plurality of data points associated with a set of second regions in a neighborhood of the first region;
   applying a weight to the second plurality of data points, wherein more weight is applied to data points in a first region of the set of second regions that is closer to the first region than a second region of the set of second regions that is farther from the first region;
   identifying, based on the weighted second plurality of data points, a regional density of data points;
   selecting a subset of the first plurality of data points associated with the region to be rendered with the map region based on the identified regional density of data points; and
   transmitting the subset of the first plurality of data points to the second device.

2. The non-transitory machine-readable medium of claim 1, wherein the desired density is specified as a number of data points per unit area.

3. The non-transitory machine-readable medium of claim 1, wherein the program further comprises a set of instructions for:
   receiving a second request from the second device;

identifying that the second request includes an additional search constraint that is in addition to a plurality of search constraints that was included within the first request;
determining, based on the identification, that the subset of the first plurality of data points is cached at the second device;
applying the additional search constraint to the subset of the first plurality of data points; and
providing the subset of the first plurality of data points after the application.

4. The non-transitory machine-readable medium of claim 3, wherein the program further comprises a set of instructions for:
identifying the desired density from the second request;
determining that the subset of the first plurality of data points that is cached at the second device satisfies the desired density from the second request; and
providing the subset of the first plurality of data points to the second device.

5. The non-transitory machine-readable medium of claim 1, wherein the program further comprises a set of instructions for:
receiving a third request from the second device;
identifying that the third request includes a subset of the plurality of search constraints that was included within the first request;
determining, based on the identification, that the subset of the first plurality of data points is not cached at the second device;
selecting a second subset of the first plurality of data points, based on the subset of the plurality of search constraints; and
transmitting the second subset of the first plurality of data points to the second device.

6. The non-transitory machine-readable medium of claim 1, wherein the program further comprises a set of instructions for determining a weighted total area of the neighborhood and a weighted total number of data points in the neighborhood based in part on weights applied to the second plurality of data points.

7. The non-transitory machine-readable medium of claim 1, wherein the instructions for identifying the regional density of data points further comprise a set of instructions for multiplying the desired density by a weighted total area of the neighborhood and dividing a product of the multiplication by a weighted total number of data points in the neighborhood.

8. The non-transitory machine-readable medium of claim 1, wherein the identified regional density comprises a sampling rate to be applied to the first plurality of data points, and wherein the set of instructions for selecting the subset comprises a set of instructions for applying the sampling rate to data points of the first plurality of data points.

9. A method of sampling data points in a map region, the method comprising:
receiving a first request for data points from a second device, wherein the first request includes a desired density of data points;
identifying a first plurality of data points associated with a first region of a map to be rendered based on the first request;
identifying a second plurality of data points associated with a set of second regions in a neighborhood of the first region;
applying a weight to the second plurality of data points, wherein more weight is applied to data points in a first region of the set of second regions that is closer to the first region than a second region of the set of second regions that is farther from the first region;
identifying, based on the weighted second plurality of data points, a regional density of data points;
selecting a subset of the first plurality of data points associated with the region to be rendered with the map region based on the identified regional density of data points; and
transmitting the subset of the first plurality of data points to the second device.

10. The method of claim 9, wherein the desired density is specified as a number of data points per unit area.

11. The method of claim 9, further comprising:
receiving a second request from the second device;
identifying that the second request includes an additional search constraint that is in addition to a plurality of search constraints that was included within the first request;
determining, based on the identification, that the subset of the first plurality of data points is cached at the second device;
applying the additional search constraint to the subset of the first plurality of data points; and
providing the subset of the first plurality of data point s after the application.

12. The method of claim 11, further comprising:
identifying the desired density from the second request;
determining that the subset of the first plurality of data points that is cached at the second device satisfies the desired density from the second request; and
providing the subset of the first plurality of data points to the second device.

13. The method of claim 9, further comprising: receiving a third request from the second device;
identifying that the third request includes a subset of the plurality of search constraints that was included within the first request;
determining, based on the identification, that the subset of the first plurality of data points is not cached at the second device;
selecting a second subset of the first plurality of data points, based on the subset of the plurality of search constraints; and
transmitting the second subset of the first plurality of data points to the second device.

14. The method of claim 9, further comprising determining a weighted total area of the neighborhood and a weighted total number of data points in the neighborhood based in part on weights applied to the second plurality of data points.

15. The method of claim 9, further comprising identifying the regional density of data points further comprise a set of instructions for multiplying the desired density by a weighted total area of the neighborhood and dividing a product of the multiplication by a weighted total number of data points in the neighborhood.

16. The method of claim 9, wherein the identified regional density comprises a sampling rate to be applied to the first plurality of data points, and wherein selecting the subset comprises a set of instructions for applying the sampling rate to data points of the first plurality of data points.

17. A device comprising:
a set of processing units for executing instructions,
a non-transitory machine-readable medium storing a program for execution by at least one processing unit, the program for sampling data points in a map region, the program comprising sets of instructions for:

receiving a first request for data points from a second device, wherein the first request includes a desired density of data points;

identifying a first plurality of data points associated with a first region of a map to be rendered based on the first request;

identifying a second plurality of data points associated with a set of second regions in a neighborhood of the first region;

applying a weight to the second plurality of data points, wherein more weight is applied to data points in a first region of the set of second regions that is closer to the first region than a second region of the set of second regions that is farther from the first region;

identifying, based on the weighted second plurality of data points, a regional density of data points;

selecting a subset of the first plurality of data points associated with the region to be rendered with the map region based on the identified regional density of data points; and transmitting the subset of the first plurality of data points to the second device.

18. The device of claim 17, wherein the desired density is specified as a number of data points per unit area.

19. The device of claim 17, wherein the program further comprises a set of instructions for:

receiving a second request from the second device;

identifying that the second request includes an additional search constraint that is in addition to a plurality of search constraints that was included within the first request;

determining, based on the identification, that the subset of the first plurality of data points is cached at the second device;

applying the additional search constraint to the subset of the first plurality of data points; and providing the subset of the first plurality of data points after the application.

20. The device of claim 19, wherein the program further comprises a set of instructions for:

identifying the desired density from the second request;

determining that the subset of the first plurality of data points that is cached at the second device satisfies the desired density from the second request; and providing the subset of the first plurality of data points to the second device.

21. The mobile device of claim 17, wherein the program further comprises a set of instructions for:

receiving a third request from the second device;

identifying that the third request includes a subset of the plurality of search constraints that was included within the first request;

determining, based on the identification, that the subset of the first plurality of data points is not cached at the second device;

selecting a second subset of the first plurality of data point s, based on the subset of the plurality of search constraints; and transmitting the second subset of the first plurality of data points to the second device.

22. The device of claim 17, wherein the program further comprises a set of instructions for determining a weighted total area of the neighborhood and a weighted total number of data points in the neighborhood based in part on weights applied to the second plurality of data points.

23. The device of claim 17, wherein the instructions for identifying the regional density of data points further comprise a set of instructions for multiplying the desired density by a weighted total area of the neighborhood and dividing a product of the multiplication by a weighted total number of data points in the neighborhood.

24. The device of claim 17, wherein the identified regional density comprises a sampling rate to be applied to the first plurality of data points, and wherein the set of instructions for selecting the subset comprises a set of instructions for applying the sampling rate to data points of the first plurality of data points.

* * * * *